US009306233B2

(12) United States Patent
Choi et al.

(10) Patent No.: US 9,306,233 B2
(45) Date of Patent: Apr. 5, 2016

(54) ANION BINDER FOR SOLID ALKALINE FUEL CELL, METHOD OF PREPARING THE SAME AND MEMBRANE-ELECTRODE ASSEMBLY

(71) Applicant: Korea Institute Of Energy Research, Daejeon (KR)

(72) Inventors: Young Woo Choi, Chungcheongbuk-do (KR); Mi Soon Lee, Daejeon (KR); Tae Hyun Yang, Daejeon (KR); Chang Soo Kim, Incheon (KR); Young Gi Yoon, Daejeon (KR); Seok Hee Park, Daejeon (KR); Sung Dae Yim, Daejeon (KR); Gu Gon Park, Daejeon (KR); Young Jun Sohn, Daejeon (KR); Minjin Kim, Daejeon (KR); Byungchan Bae, Seoul (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 332 days.

(21) Appl. No.: 13/924,840

(22) Filed: Jun. 24, 2013

(65) Prior Publication Data
US 2014/0315115 A1    Oct. 23, 2014

(30) Foreign Application Priority Data
Apr. 23, 2013   (KR) .......................... 10-2013-0044861

(51) Int. Cl.
| | |
|---|---|
| *H01M 8/02* | (2006.01) |
| *H01M 8/10* | (2006.01) |
| *H01M 8/08* | (2006.01) |
| *H01M 4/86* | (2006.01) |

(52) U.S. Cl.
CPC ............ *H01M 8/083* (2013.01); *H01M 4/8668* (2013.01); *H01M 2300/0082* (2013.01); *Y02E 60/50* (2013.01); *Y02P 70/56* (2015.11)

(58) Field of Classification Search
CPC ..... H01M 8/02; H01M 8/0284; H01M 8/083; H01M 4/8668; H01M 2300/0082
See application file for complete search history.

(56) References Cited

U.S. PATENT DOCUMENTS

| 2001/0018478 A1* | 8/2001 | Zheng ............................ 524/115 |
| 2011/0105631 A1* | 5/2011 | Wright ............................ 521/27 |
| 2012/0015228 A1* | 1/2012 | Yoon et al. ...................... 429/144 |

FOREIGN PATENT DOCUMENTS

KR    1020100052104 A  *  5/2010  .............. H01M 8/10

OTHER PUBLICATIONS

Machine Translation of: KR-1020100052104 A, Choi et al., May 19, 2010.*

* cited by examiner

*Primary Examiner* — Kenneth Douyette
(74) *Attorney, Agent, or Firm* — Galgano IP Law PLLC; Thomas M. Galgano; Jessica G. McDonald

(57) ABSTRACT

The present invention concerns the preparation of an anion binder for a solid alkaline fuel cell which enhances durability to electrochemical reactions and makes the production of electrode slurry easy. A method of preparing an anion binder for a solid alkaline fuel cell includes: (A) mixing an electrolytic monomer of quaternary ammonium salts having a cation group, a bisacrylicamide crosslinking agent having a tertiary amino group, and water together by stirring; (B) mixing the mixture with a photoinitiator; (C) interposing the solution between polyethylene terephthalate films and irradiating the solution with ultraviolet light for crosslinking and polymerization; and (D) pulverizing crosslinked polymerized resin to a nano size.

8 Claims, 1 Drawing Sheet

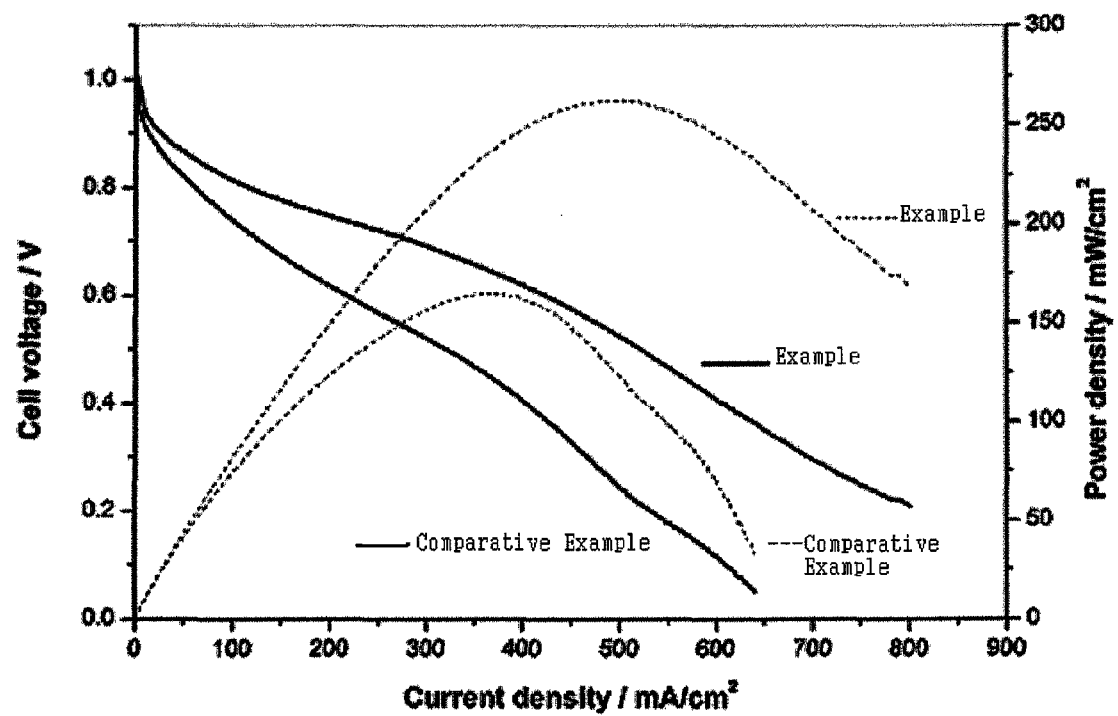

ANION BINDER FOR SOLID ALKALINE FUEL CELL, METHOD OF PREPARING THE SAME AND MEMBRANE-ELECTRODE ASSEMBLY

BACKGROUND OF THE INVENTION

1. Field of the Invention

The present invention relates to an anion binder for a solid alkaline fuel cell, a method of preparing the same, and a membrane-electrode assembly, and more particularly, to a method of preparing an anion binder for a solid alkaline fuel cell, which is prepared in the form of nanosized powder after crosslinking, and exhibits enhanced durability to electrochemical reactions and makes it easy to fabricate electrodes.

2. Discussion of the Related Art

A fuel cell is a device that generates electrical energy from fuel and air supplied from the outside by using electrodes. The fuel cell has the advantage of improving the efficiency of fuel use and generating less environmental pollutants such as emissions. Moreover, while the existing primary and secondary cells are devices that charge and discharge a limited amount of energy, fuel cells produce electrical energy continually for as long as fuel is supplied. Hence, there is much research conducted on the fuel cells, which are emerging as the next generation clean energy source.

An ion-exchange membrane is a kind of polymer separation membrane, which is capable of selectively separating anions and cations depending on the type of ion exchange group introduced into the membrane. For a cation exchange membrane, which is available for commercial use, the ion exchange groups are roughly classified into strongly acidic sulfonic acid groups ($-SO_3-$) and weakly acidic carboxylic acid groups ($-COO-$). For an anion exchange membrane, a strong basic quaternary ammonium group ($-N+R3$) is usually used as the ion exchanger.

Such ion exchange membranes are used in electrolysis for desalination and purification, water-splitting electrolysis, diffusion dialysis for recovery of acid from an acid waste solution, electrodeionization for ultrapure water production, and so on. Moreover, following the recent report about the possibility of using an anion-exchange membrane for fuel cells, more and more research is being conducted to use an anion-exchange membrane for fuel cells.

A fuel cell includes a fuel electrode (anode) for supplying hydrogen ions and electrons from hydrogen or methanol and an air electrode (cathode) for supplying oxygen. A fuel cell produces electricity on the principle that when fuel is supplied from the fuel electrode, the fuel is divided into hydrogen ions and electrons, the hydrogen ions are combined with oxygen supplied from the air electrode through an electrolyte membrane to form water, and the electrons separated from the fuel in the fuel electrode produce current through an external circuit, thereby generating electricity, heat, and water by an electrochemical reaction, which is the reverse of electrolysis of water. Different types of fuel cells include polymer electrolyte membrane fuel cells (PEMFC), direct methanol fuel cells (DMFC), direct borohydride fuel cells (DBFC), and solid alkaline fuel cells (SAFC). Among these types of fuel cells, the polymer electrolyte membrane fuel cells, the direct methanol fuel cells, and the direct borohydride fuel cells have to employ a cation-exchange membrane, a cation or hydrogen-ion conducting electrolyte membrane, as the electrolyte. On the other hand, the solid alkaline fuel cells and the direct borohydride fuel cells have to employ an anion-exchange membrane, a hydroxyl-ion conducting electrolyte membrane, as the electrolyte. The direct borohydride fuel cells can use both the cation-exchange membrane and the anion-exchange membrane.

Unlike fuel cells employing a cation-exchange membrane, fuel cells employing an anion-exchange membrane can use non-precious metal catalysts or non-platinum catalysts for electrodes, thus achieving cost reduction. Accordingly, research on the preparation of anion-exchange membranes is increasingly conducted for the development of fuel cells employing an anion-exchange membrane.

Meanwhile, non-crosslinked polymer has been conventionally used as a binder used for a membrane-electrode assembly of a solid alkaline fuel cell. The non-crosslinked polymer was problematic in terms of durability because it is easily deteriorated by an electrochemical reaction. There have been attempts to use a crosslinked binder in order to solve this problem. Korean Patent Registration No. 0738058 discloses a fuel cell electrode including: a support; and a catalyst layer formed on the support, the catalyst layer including: a support catalyst; and a polymerization product obtained by the polymerization of a mixture of a polyurethane compound and polyethylene(meta) acrylic acid, a method of preparing the same, and a fuel cell having the same. However, such a crosslinked binder causes problems in the production of electrode slurry resulting from the crosslinking of polymer resin.

As such, the present inventors perfected the present invention after conducting research on ways to improve durability to electrochemical reactions and solve the problems occurring in the production of electrode slurry.

SUMMARY OF THE INVENTION

A technical task of the present invention is to provide an anion binder for a solid alkaline fuel cell which enhances durability to electrochemical reactions and makes the production of electrode slurry easy.

Another task of the present invention is to provide a method of preparing an anion binder for a solid alkaline fuel cell.

Still another task of the present invention to provide a membrane-electrode assembly using an anion binder for a solid alkaline fuel cell.

To accomplish the above-described tasks, the present invention provides a method of preparing an anion binder for a solid alkaline fuel cell, the method including: (A) mixing an electrolytic monomer of quaternary ammonium salts having a cation group, a bisacrylicamide crosslinking agent having a tertiary amino group, and water together by stirring; (B) mixing the mixture with a photoinitiator; (C) interposing the solution between polyethylene terephthalate films and irradiating the solution with ultraviolet light for crosslinking and polymerization; and (D) pulverizing crosslinked polymerized resin to a nano size.

In the step (A), the electrolytic monomer of quaternary ammonium salts having a cation group may be vinylbenzyl trimethylammonium chloride. The bisacrylicamide crosslinking agent having a tertiary amino group may be N,N'-bisacryloylpiperazine. Preferably, the electrolytic monomer of quaternary ammonium salts, the bisacrylicamide crosslinking agent having a tertiary amino group, and the water may be mixed together by stirring at a weight ratio of 60~75:5~16:20~25. In the step (B), the photoinitiator is preferably 2-hydroxy-2-methyl-1-phenyl-1-one. Preferably, 100 parts by weight of the mixed solution are mixed with 0.5 to 2 parts by weight of the photoinitiator.

In the step (C), the solution is preferably irradiated with ultraviolet light having an energy of 30 to 150 mJ/cm² for crosslinking.

In the step (D), the pulverizing may include: (D1) primarily pulverizing the crosslinked polymerized resin to a size of 40 to 60 μm by a grinding pulverizer; and (D2) dispersing and secondarily pulverizing the powder obtained in the primary pulverization to a size of 150 to 250 nm by a wet pulverizer. In the step (D2), 5% by weight of the powder obtained in the primary pulverization is preferably dispersed in a mixed solution of 1-propanol and water at a weight ratio of 9:1 and pulverized.

To accomplish the above-described tasks, the present invention provides a membrane-electrode assembly having excellent hydroxide ion conductivity, which is prepared by forming an electrode layer on at least one surface of a hydroxide ion conductive electrolyte membrane by using the binder.

According to the present invention, the polymer binder is crosslinked in the polymer preparation step to suppress deterioration resulting from an electrochemical reaction and enhance durability, and the polymer binder is prepared in the form of nanosized powder to solve the problems occurring in the production of electrode slurry resulting from the crosslinking of polymer resin. This contributes to the production of highly-uniformly dispersed electrode slurry and the production of a membrane-electrode assembly having excellent hydroxide ion conductivity, thereby improving the performance of the solid alkaline fuel cell.

BRIEF DESCRIPTION OF THE DRAWINGS

FIG. 1 is a graph showing the performance of a fuel cell in accordance with an exemplary embodiment of the present invention.

DETAILED DESCRIPTION OF THE PREFERRED EMBODIMENTS

Hereinafter, the present invention will be described below in detail.

According to a concrete embodiment of the present invention, there is provided a method of preparing an anionic binder for a solid alkaline fuel cell, the method including: (A) mixing an electrolytic monomer of quaternary ammonium salts having a cation group, a bisacrylicamide crosslinking agent having a tertiary amino group, and water together by stirring; (B) mixing the mixture with a photoinitiator; (C) interposing the solution between polyethylene terephthalate films and irradiating the solution with ultraviolet light for crosslinking and polymerization; and (D) pulverizing crosslinked polymerized resin to nano size.

In the step (A), the electrolytic monomer of quaternary ammonium salts is preferably, but not limited to, vinylbenzyl trimethylammonium chloride as represented by the following Chemical Formula I.

(Chemical Formula I)

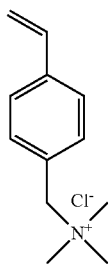

The bisacrylicamide crosslinking agent having a tertiary amino group may be N,N'-bisacryloylpiperazine as represented by the following Chemical Formula II. The bisacrylicamide crosslinking agent is not limited thereto as long as it has a tertiary amino group.

(Chemical Formula II)

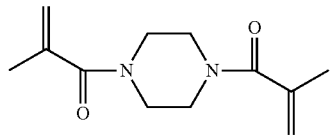

In the step (A), the electrolytic monomer of quaternary ammonium salts having a cation group may be vinylbenzyl trimethylammonium chloride. The bisacrylicamide crosslinking agent having a tertiary amino group may be N,N'-bisacryloylpiperazine. Preferably, the electrolytic monomer of quaternary ammonium salts, the bisacrylicamide crosslinking agent having a tertiary amino group, and the water may be mixed together, by stirring at a weight ratio of 60~75:5~16:20~25.

A photoinitiator for radical polymerization is preferably used as the initiator. The initiator is preferably, but not specifically limited to, 2-hydroxy-2-methyl-1-phenyl-1-one. Preferably, 100 parts by weight of the mixed solution are mixed with 0.5 to 2 parts by weight of the photoinitator.

In the step (C), the solution is preferably irradiated with ultraviolet light having an energy of 30 to 150 mJ/cm² for crosslinking.

In the step (D), the pulverizing may include: (D1) primarily pulverizing the crosslinked polymerized resin to a size of 40 to 60 μm by a grinding pulverizer; and (D2) dispersing and secondarily pulverizing the powder obtained in the primary pulverization to a size of 150 to 250 nm by a wet pulverizer. In the step (D2), 5% by weight of the powder obtained in the primary pulverization is preferably dispersed in a mixed solution of 1-propanol and water at a weight ratio of 9:1 and pulverized. As the binder is prepared in the form of nanosized powder, this solves the problems occurring in the production of electrode slurry resulting from the crosslinking of polymer resin and therefore enhances the performance of the fuel cell.

The dispersed powder solution is used to produce electrode slurry. According to a concrete embodiment of the present invention, a platinum-supported carbon black catalyst (Johnson Mattey, Pt/C 40 wt %) or the like may be used as an electrode catalyst. 70% by weight of an electrode catalyst is added to 30% by weight of the thus-obtained crosslinked polymer resin dispersion solution used as a binder to thus prepare a slurry stock solution. Next, a solution containing 1-propanol and water at a weight ratio of 9:1 is added to the slurry stock solution so that the slurry stock solution has a concentration of 10%, thereby preparing the final electrode slurry.

Subsequently, the electrode layer slurry is applied by a spray gun onto one surface of a dried hydroxide-ion conductive electrolyte membrane (thickness: 25 μm) placed on a hot plate of 80° C., and isopropyl alcohol and water are removed from the applied electrode slurry layer, thereby forming an electrode layer. Next, another electrode layer is formed on the other surface of the electrolyte membrane in the same manner. After that, a membrane-electrode assembly, a gas diffusion layer (SGL 10BC), a separating plate (graphite), and an end plate (gold coated stainless steel) are combined together at a pressure of 300 kgf/cm² to prepare a unit cell.

The test results showed that the thus-prepared solid alkaline fuel cell has higher performance than a fuel cell using nonlinked binder resin.

EXAMPLES

Hereinafter, the present invention will be described in more detail by examples.

However, the following Examples are only illustrative of the present invention and the present invention is not limited by the following Examples.

Example 1

Preparation of Hydroxide Ion Conducting Binder (vinylbenzyl)trimethylammonium chloride as a hydroxide ion conducting monomer, N,N'-bisacryloylpiperazine as a crosslinking agent, and deionized water were mixed together by stirring at a weight ratio of 61.5:15.4:23.1, and 100 parts by weight of the mixed solution was mixed with 1 part by weight of a dilution of 2-hydroxy-2-methyl-1-phenyl-1-one (10 wt %) as a photoinitiator in methanol.

Afterwards, the solution was interposed between polyethylene terephthalate films to avoid the permeation of oxygen, which interferes with polymerization, and then irradiated with ultraviolet (UV) light having an energy of 30 to 150 mJ/cm$^2$.

Crosslinked polymerized resin was pulverized to a size of 50 μm by a grinding pulverizer, and 5% by weight of the powder obtained in the primary pulverization was dispersed in a mixed solution of 1-propanol and water at a weight ratio of 9:1 and pulverized by a wet pulverizer until the powder has a size of 200 nanometers.

Example 2

Preparation of Membrane-Electrode Assembly

Preparation of Anion-Exchange Polymer Electrolyte Membrane (vinylbenzyl)trimethylammonium chloride, N,N'-bisacryloylpiperazine, and deionized water were mixed together by stirring at a weight ratio of 61.5:15.4:23.1, and 100 parts by weight of the mixed solution was mixed with 1 part by weight of a dilution of 2-hydroxy-2-methyl-1-phenyl-1-one (Darocur 1173; 10 wt %) as a photoinitiator in methanol.

Afterwards, a polyolefin-based porous polymer support having a film thickness of 25 μm, an average pore size of 0.07 μm, and a pore distribution of 45% was impregnated with the solution so that a monomer solution soaks into the support. Subsequently, an electrolyte-impregnated membrane was interposed between polyethylene terephthalate (PET) films and then irradiated with ultraviolet (UV) light having an energy of 30 to 150 mJ/cm$^2$.

After the crosslinking step, the PET films were removed, by-products on the membrane surface were removed to flatten the surface, and then the composite membrane was washed several times with ultrapure water, thereby preparing a polymer composite membrane.

Preparation of Membrane-Electrode Assembly

The binder solution prepared in Example 1 was used to prepare electrode slurry. A platinum-supported carbon black catalyst (Johnson Matthey, Pt/C 40 wt %) was used as an electrode catalyst.

70% by weight of an electrode catalyst is added to 30% by weight of the crosslinked polymer resin dispersion solution used as a binder prepared in Example 1 to thus prepare 100% by weight of a slurry stock solution. Next, a solution containing 1-propanol and water at a weight ratio of 9:1 is added to the slurry stock solution so that the slurry stock solution has a concentration of 10%, thereby preparing the final electrode slurry.

Subsequently, the electrode layer slurry is applied by a spray gun onto one surface of the hydroxide-ion conductive electrolyte membrane (thickness: 25 μm) placed on a hot plate of 80° C., and isopropyl alcohol and water are removed from the applied electrode slurry layer, thereby forming a square electrode layer whose one side is 5 cm. Next, another square electrode layer whose one side is 5 cm is formed on the other surface of the electrolyte membrane in the same manner. In the thus-obtained membrane-electrode assembly, the effective area of each electrode was 25 cm$^2$, and the platinum loading of each electrode was 0.5 mg/cm$^2$.

Comparative Example 1

Preparation of Membrane-Electrode Assembly

In a comparative example, a membrane prepared in the same manner as the membrane used in the above Example was used as a hydroxide ion conducting electrolyte membrane, the same product as in the above Example was used as an electrode catalyst, and a membrane-electrode assembly was prepared in the same manner as in Example 2, except that AS-4, a semi-commercial binder solution manufactured by Tokuyama, was used as a binder polymer resin solution.

Test Example 1

Preparation of Membrane-Electrode Assembly

The membrane-electrode assembly prepared in each of Example 2 and Comparative Example 1, a gas diffusion layer (SGL 10BC), a separating plate (graphite), and an end plate (gold coated stainless steel) are combined together at a pressure of 300 kgf/cm$^2$ to prepare a unit cell.

In order to match the stoichiometric ratio of an electrochemical reaction, hydrogen was allowed to flow through an anode, and oxygen from which carbon dioxide was removed was allowed to flow through a cathode. The unit cell was configured to be operated at ordinal pressure under the condition that the hydrogen stream relative humidity is 100% and the cell temperature is 50° C. While the hydrogen and the carbon dioxide-free air were being respectively supplied, the current density was increased at a constant rate. By measuring the resulting potential change, the performance of the solid alkaline fuel cell was evaluated.

The result is shown in Table 1. The performance of an alkaline fuel cell using the membrane-electrode assembly prepared in Example 2 exhibited a maximum current density of 262 mW/cm$^2$, and the performance of an alkaline fuel cell using the membrane-electrode assembly prepared in Comparative Example 1 exhibited a maximum current density of 164 mW/cm$^2$. Therefore, it can be found out that the performance of the alkaline fuel cell using the membrane-electrode assembly prepared in Example 2 was improved 1.6 times.

What is claimed is:

1. A method of preparing an anion binder for a solid alkaline fuel cell, the method comprising:
   (A) mixing an electrolytic monomer of quaternary ammonium salts having a cation group, a bisacrylicamide crosslinking agent having a tertiary amino group, and water together by stirring;

(B) mixing the mixture with a photoinitiator;
(C) interposing the solution between polyethylene terephthalate films and irradiating the solution with ultraviolet light for crosslinking and polymerization; and
(D) pulverizing crosslinked polymerized resin to a nano size, wherein (D) comprises:
(D1) primarily pulverizing the crosslinked polymerized resin to a size of 40 to 60 μm by a grinding pulverizer; and
(D2) dispersing and secondarily pulverizing the powder obtained in the primary pulverization to a size of 150 to 250 nm by a wet pulverizer.

2. The method of claim 1, wherein the electrolytic monomer of quaternary ammonium salts having a cation group is vinybenzyl trimethylammonium chloride.

3. The method of claim 1, wherein the bisacrylicamide crosslinking agent having a tertiary amino group is N,N'-bisacryloylpiperazine.

4. The method of claim 1, wherein the electrolytic monomer of quaternary ammonium salts, the bisacrylicamide crosslinking agent having a tertiary amino group, and the water are mixed together by stirring at a weight ratio of 60~75:5~16:20~25.

5. The method of claim 1, wherein the photoinitiator is 2-hydroxy-2-methyl-1-phenyl-1-one.

6. The method of claim 1, wherein the solution is irradiated with ultraviolet light having an energy of 30 to 150 mJ/cm$^2$ for crosslinking.

7. The method of claim 1, wherein 5% by weight of the powder obtained in the primary pulverization is dispersed in a mixed solution of 1-propanol and water at a weight ratio of 9:1 and pulverized.

8. A membrane-electrode assembly which is formed by the binder prepared according to claim 1.

* * * * *